United States Patent Office 3,236,850
Patented Feb. 22, 1966

3,236,850
HYDROPEROXIDE-AMINE SALTS
Alexis A. Oswald, Clark, N.J., and Fernand Nöel, Sarnia, Ontario, Canada, assignors to Esso Research and Engineering Company, a corporation of Delaware
No Drawing. Filed June 14, 1961, Ser. No. 116,936
8 Claims. (Cl. 260—268)

The present invention relates to hydroperoxide salts and the preparation thereof. More specifically it concerns organic hydroperoxide-amine salts that are useful as catalysts and oxidizing agents.

It has been found that organic hydroperoxides react with amines to form salts. Many of these salts are stable, crystalline solids that have much greater utility than the corresponding hydroperoxides. The salts can be prepared by simply mixing the reactants in the desired proportion, usually an equivalent amount, at ambient conditions. The reaction can be demonstrated by the following equations which represent typical reactions:

(a)  $RCO_2H + NR_3 \rightarrow RCO_2H \cdot NR_3$ 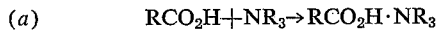

(b)  $R(CO_2H)_2 + 2NR_3 \rightarrow R(CO_2H \cdot NR_3)_2$ 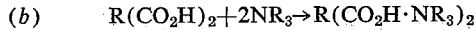

(c)  $2RCO_2H + NR_3N \rightarrow RCO_2H \cdot NR_3N \cdot HO_2R$ 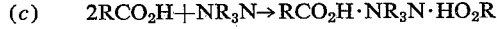

wherein R is an organic radical, usually hydrocarbyl. In the above reactions neutral salts are prepared. However, it is possible to make basic or acid salts by employing an excess of one of the reactants.

The hydroperoxide-amine salts of the present invention are characterized by the following group.

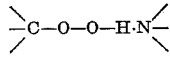

The remaining carbon valences are satisfied with substituted or unsubstituted hydrocarbyl radicals and the nitrogen valences are satisfied with hydrogen and/or at least one substituted and/or unsubstituted hydrocarbyl radical. Where the hydroperoxide and amine reactants contain more than 1 hydroperoxy or amine group, the reaction product is a complex substance sometimes containing many of the above-mentioned characteristic groups, that is it is polymeric in nature.

Most of the hydroperoxide-amine compounds coming within the scope of the present invention have the empirical formula $$C_{4-50}H_{5-100}N_{1-4}O_{2-8}$$

and can be further defined by one or more of the following general formulas:

(1)  $R(O_2H)_y \cdot [N(R_a)_z]_y$ 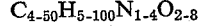

wherein R is a substituted or unsubstituted hydrocarbyl group containing 1 to 20 carbon atoms which is preferably an alkyl, alkylene or aralkyl group $R_a$ is hydrogen or a substituted or unsubstituted hydrocarbyl radical selected from the group consisting of alkyl aralkyl and alkylene groups which may or may not contain nitrogen, oxygen, or sulfur in their chains; $R_a$ may also be part of a heterocyclic structure in which the nitrogen atom shown in the formula forms part of one or more of the rings in said structure; y is an integer between 1 and 5 inclusive and z is an integer between 1 and 3 inclusive.

(2)  $[N(R_c)_3N \cdot HO_2R_e O_2H \cdot]_n$ 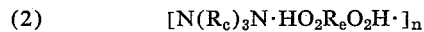

wherein $R_c$ is a lower alkylene radical; $R_e$ is a hydrocarbyl radical containing 1 to 20 carbons atoms selected from the group consisting of alkyl and aralkyl radicals; n is an integer of 1 or 2 to 10.

The preferred organic hydroperoxide-amine salts contain carbon, hydrogen, nitrogen and oxygen only. Some of the preferred compounds can be represented by the following formulas:

(3)  $R_fO_2H \cdot N(CH_2CH_2)_3N \cdot HO_2R_f$ 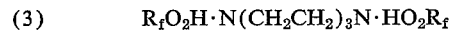

wherein $R_f$ is a hydrocarbyl radical containing 1 to 20 carbon atoms and is selected from the group consisting of alkyl and aralkyl radicals.

(4)  $R_fO_2H \cdot N(R_g)_3$ 

wherein $R_f$ is the same as in Formula 3 and $R_g$ is selected from the group consisting of hydrogen and $C_1$ to $C_{12}$ alkyl radicals; $R_g$ is preferably an alkyl radical.

The organic amine reactant can be primary, secondary or tertiary amine. The reactant may contain 1 to 4 amine functions, that is to say, it may be a monoamine, diamine, triamine or tetramine. It is generally a relatively low molecular weight compound, such as triethylenediamine or methylamine, but this does not mean that higher molecular weight amines, such as tertiary octylamine cannot be employed. The amine reactants may be defined by the following formula:

$$N(R_h)_3$$ 

wherein $R_h$ is a hydrogen, alkyl or alkylene (which may or may not contain nitrogen, oxygen, sulfur in its chain) radical. It may have a cyclic or aliphatic structure and usually is a primary, a secondary or a tertiary amine composed solely of carbon, nitrogen and hydrogen atoms. Heteroaromatic compounds containing a basic nitrogen atom in the ring, such as pyridine, can be also used as amine components.

Among the amine reactants which may be used to prepare the salts are methylamine, n-hexadecylamine, sec. butylamine, cyclohexylamine, 1,1,3,3 - tetramethylbutylamine, di-n-laurylamine, di-i-propylamine, trimethylamine, triethanolamine, hexamethylenediamine, piperidine, N,N'-dimethylpiperazine, morpholine, triethylenediamine, hexamethylenetetramine, pyridine, quinoline and acridine.

The organic hydroperoxide reactant, which is a weak acid containing at least 2 oxygen atoms singly linked, can contain more than 1 hydroperoxy group, i.e., 2 hydroperoxy groups, although usually it contains only 1 such group. It can be aliphatic or cyclic in structure and its organic moiety usually is a $C_1$ to $C_{20}$ hydrocarbyl radical selected from the group consisting of alkyl and aralkyl radicals. Representative of the hydroperoxy compounds that may be used in accordance with the present invention are tertiary butyl hydroperoxide, cumene hydroperoxide, 1-tetrahydronaphthyl hydroperoxide, n-hexadecyl hydroperoxide, methene hydroperoxide, diisopropylbenzene dihydroperoxide, 2,5-dimethylhexane-2,5-dihydroperoxide, 2-(2-naphthylmercapto-) indanyl 1-hydroperoxide, and 1-hydroxycyclohexyl hydroperoxide.

The reaction can be effected under ambient conditions by simply mixing the reactants in the presence or absence of a solvent and agitating the resulting mixture to insure complete conversion. The reaction temperature is not critical, but it has been found most convenient to carry out the reaction at temperatures between about −10 and 50° C. In some instances when the temperature exceeds 60° C., side reactions occur which reduce the yield of the desired salt and make product separation more difficult.

The reaction in most cases is substantially instantaneous and seldom does it require more than 10 or 15 minutes for the reaction to reach completeness. It is not unusual for the reaction to be complete within a few seconds or a minute. In most instances the conversion is essentially quantitative.

If the reactants are not liquid, a suitable solvent, preferably one in which the final product is insoluble, should be employed. Among the inert solvents that may be used are aliphatic and cyclic hydrocarbons, such as hexane, cyclohexane and toluene, oxygenated liquids, such as diethylether, tetrahydrofuran, dioxane, acetone and methylethyl ketone. The aliphatic and cyclic hydrocarbon, ether and ketone solvents are preferably used in an amount that is approximately equal to the total weight of the reactants. While up to 20 parts by weight of solvent may be used per part of total reactants, it is generally best to employ a weight ratio of solvent to reactants between about 0.5 and 5. The preferred solvents are lower molecular weight organic liquids that contain 4 to 8 carbon atoms.

In some instances the product precipitates as the reaction proceeds and is easily separated from the reaction mixture by filtration or centrifugation. In other cases, for example where the product is soluble in the solvent, it is necessary to strip the reaction mixture of the volatile substances, including any solvent, to recover the hydroperoxide-amine salt. In some cases the products are liquids and can be made by simply mixing the calculated quantities of the reactants.

The hydroperoxide-amine salts of the present invention are similar to other substituted ammonium salts. Consequently, they may be called alkylammonium peroxides.

Representative of the N-substituted ammonium hydrocarbyl peroxides prepared in accordance with the present invention are 1,1,3,3-tetramethylbutylammonium α,α-dimethylbenzyl peroxide; bis-n-hexadecylammonium 2,5-dimethylhexane-2,5 - diperoxide; di - iso - propylammonium α,α-dimethylbenzyl peroxide; bis-tri-n-butylammonium 2,5-dimethylhexane - 2,5 - diperoxide; triethylenediammonium bis-t-butylperoxide; triethylenediammonium bis-1-tetrahydronaphthyl peroxide; triethylenediammonium 2,5-dimethylhexane-2,5-diperoxide; piperidinium α,α-dimethylbenzyl peroxide; diethylenediammonium 2,5-dimethylhexane-2,5-diperoxide; N,N′-dimethyl-diethylenediammonium 2,5-dimethylhexane - 2,5 - diperoxide; bis-morpholinium p-diisopropylbenzene diperoxide; pyridinium α,α-dimethylbenzyl peroxide; acridinium 2,5-dimethylhexane-2,5-diperoxide; bis-hydroxyethylammonium α,α-dimethylbenzyl peroxide; triethylenediammonium bis-2-(2-naphthylmercapto-)1-indanyl peroxide; and triethylenediammonium bis-1-hydroxycyclohexyl peroxide.

Most of the salts of the present invention are solids, although some are high density liquids. The solids are generally crystalline and can be readily purified so that they are much more stable than the corresponding impure hydroperoxides. The salts made with tertiary alkylamines have been found to be outstandingly stable. These salts have many uses, among which are the utilization of them as oxidants, intermediates in alcohol synthesis and catalysts in polymerization reactions.

The invention is illustrated by the following examples:

EXAMPLE 1

To a solution consisting of 11.2 grams of triethylenediamine (0.1 mole) and 40 ml. of toluene was slowly added 45.6 g. of 66.3 wt. percent α,α-dimethylbenzyl hydroperoxide (0.2 mole) at room temperature. The reaction mixture was stirred during the introduction of the last-named reactant and it was noted that a slurry formed during the addition of the hydroperoxide. The resulting slurry was cooled in a carbon dioxide-methanol bath and filtered to recover the crystalline precipitate. The crystals were washed three times with 20 ml. portions of n-pentane while on the filter and dried under vacuum. The above run yielded 38.1 g. of triethylenediammonium bis-α,α-dimethylbenzyl peroxide which had the following general formula and melted at 86–87° C.

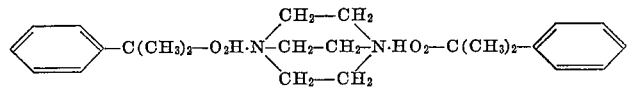

The product had 98% of the theoretical peroxide content and upon analysis was found to contain 69.54% carbon, 8.9% hydrogen and 6.63 nitrogen. The theoretical carbon, hydrogen and nitrogen contents are 69.2, 8.71 and 6.73%, respectively.

EXAMPLE 2

In another run, 11.2 g. of triethylenediamine was reacted with 22.5 g. of t-butyl hydroperoxide (0.2 mole) in the presence of 40 ml. of toluene at room temperature and atmospheric pressure. Again a slurry was formed which was filtered, cooled and washed with n-pentane as described in the previous example. The dried product comprised 17 g. of triethylenediammonium bis-t-butyl peroxide which was a colorless crystalline solid melting at 73–74° C. The product had 91% of the theoretical peroxide content and carbon, hydrogen and nitrogen analyses established that it had the formula $C_{12}H_{32}N_2O_4$. The general structural formula for the product is as follows:

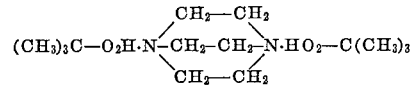

EXAMPLE 3

Equimolar amounts of α,α-dimethylbenzyl hydroperoxide (66.3 wt. percent) and 1,1,3,3-tetramethylbutylamine were admixed with agitation at room temperature and an exothermic reaction was observed. An analysis of the liquid product recovered showed it contained 99% of the theoretical peroxide content and had the following general structural formula:

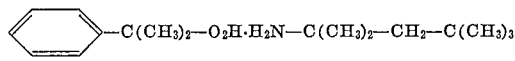

EXAMPLE 4

Various nitrogen compounds and hydroperoxides were reacted in the specified molar ratios in the presence of a solvent which was either toluene or diethylether. The reactants were usually combined in tenth mole quantities and allowed to react with agitation at room temperatures in the presence of 25 to 500 ml. of the solvent. The results are summarized in the following table:

butylamine as indicated by the yellow color produced by the disulfide formed.

*N-substituted ammonium hydrocarbyl peroxides*

| Components | | | |
|---|---|---|---|
| Nitrogen Compound | Mole | Hydroperoxide | Mole |
| $C_{16}H_{33}$—$NH_2$ | 2 | $HO_2$—$C(CH_3)_2$—$(CH_2)_2$—$C(CH_3)_2$—$O_2H$ | 1 |
| $N(CH_2$—$CH_2)_3N$ | 1 | $(CH_3)_3$—$C$—$O_2H$ | 2 |
| $N(CH_2$—$CH_2)_3N$ | 1 | ⬡—$C(CH_3)_2$—$O_2H$ | 1 |
| $N(CH_2$—$CH_2)_3N$ | 1 | ⬡—$O_2H$ | 2 |
| $N(CH_2$—$CH_2)_3N$ | 1 | $HO_2$—$C(CH_3)_2$—$(CH_2)_2$—$C(CH_3)_2$—$O_2H$ | 1 |
| $CH_3$—$N(CH_2$—$CH_2)_2N$—$CH_3$ | 1 | $HO_2$—$C(CH_3)_2$—$(CH_2)_2$—$C(CH_3)_2$—$O_2H$ | 1 |
| $HN(CH_2$—$CH_2)_2NH$ | 1 | $HO_2$—$C(CH_3)_2$—$(CH_2)_2$—$C(CH_3)_2$—$O_2H$ | 2 |
| $N(CH_2$—$CH_2)_3N$ | 1 | $(CH_3)_3C$—$O_2H$ | 1 |
| Hexamethylenetetramine | 1 | $(CH_3)_3C$—$O_2H$ | 2 |
| Hexamethylenetetramine | 2 | $HO_2$—$C(CH_3)_2$—$(CH_2)_2$—$C(CH_3)_2$—$O_2H$ | 5 |
| (acridine) | 2 | $HO_2$—$C(CH_3)_2$—$(CH_2)_2$—$C(CH_3)_2$—$O_2H$ | 1 |
| (phenazine) | 1 | $HO_2$—$C(CH_3)_2$—$(CH_2)_2$—$C(CH_3)_2$—$O_2H$ | 1 |

| Summary Formula | M.P., ° C. | Solvent | Yield, Percent | Analyses, Percent | | | Peroxide Content Mercaptan Method |
|---|---|---|---|---|---|---|---|
| | | | | Found | | | |
| | | | | C | H | N | |
| $C_{40}H_{85}N_2O_4$ | 50–56 | Toluene | 73 | 72.58 | 13.31 | 4.11 | 94 |
| $C_{14}H_{32}N_2O_4$ | 74–76 | Ether | 93 | 57.90 | 11.22 | 9.70 | 100 |
| $C_{24}H_{36}N_2O_4$ | 87.5–88.5 | do | 96 | 69.54 | 8.89 | 6.63 | 99 |
| $C_{26}H_{36}N_2O_4$ | 47–48 | do | 91 | 70.96 | 8.34 | 6.25 | 97 |
| $C_{14}H_{30}N_2O_4$ | 128–131 | do | 82 | 57.92 | 10.39 | 9.68 | 98 |
| $C_{14}H_{42}N_2O_4$ | Semisolid | Toluene | 86 | 57.48 | 11.10 | 9.12 | |
| $C_{20}H_{46}N_2O_8$ | 74–75 | do | 88 | 54.21 | 10.50 | 6.76 | |
| $C_{10}H_{22}N_2O_2$ | 52–55 | Ether | 90 | 58.50 | 11.23 | 13.40 | 101 |
| $C_{14}H_{21}N_4O_4$ | 74 (dec.) | | 52 | 52.61 | 10.54 | 17.04 | 99 |
| $C_{22}H_{48}N_4O_8$ | 88–90 | Toluene | 8 | 53.59 | 9.87 | 9.36 | 102 |
| $C_{34}H_{36}N_2O_4$ | 104–105 | Ether | 92 | 76.24 | 6.93 | 5.20 | 96 |
| $C_{20}H_{26}O_4N_2$ | 90 (dec.) | Toluene | 61 | 67.10 | 7.37 | 7.87 | 94 |

The data in the above table show that crystalline peroxide salts of long chain alkylamines, e.g. cetylamine, can be prepared by reacting such amines with polyhydroperoxides, such as 2,5-dimethylhexane-2,5-dihydroperoxide. Basic peroxide salts can be synthesized by reacting a monohydroperoxide, e.g. tertiary butyl hydroperoxide, with a polyamine, e.g. triethylenediamine and hexamethylenetetramine, in an equimolar ratio. Acid salts can be made by reacting the amine and hydroperoxide so as to leave 1 or more of the hydroperoxy groups free.

When piperazine is reacted with 2,5-dimethylhexane-2,5-dihydroperoxide, the salt formed contains 1 mole of the amine and 2 moles of the hydroperoxide. It is believed that the formation of this salt, which does not contain an equivalent amount of amine and hydroperoxide, is due to steric factors.

The Mercaptan Method used to determine the peroxide content of the salts is as follows:

The peroxide salt (0.2 g.) is dissolved in 20 ml. of benzene containing 0.25 mole/liter of 2-naphthalenethiol. To this is added 0.1 ml. of 1,1,3,3-tetramethylbutylamine and the reaction mixture is allowed to stand for a half hour to complete the reaction. Samples were then taken and titrated for thiol content with silver nitrate, using a potentiometer having a silver-glass electrode pair. The reaction between the thiol and peroxide compound was usually completed in a few minutes in the presence of the butylamine as indicated by the yellow color produced by the disulfide formed.

The peroxide salts of the present invention, especially triethylenediammonium bis-$\alpha,\alpha$-dimethylbenzyl peroxide, are highly effective as polymerization catalysts. For example, freshly distilled styrene (100 ml.), containing 0.62 g. (0.0015 mole) of dissolved cumene hydroperoxide-triethylenediamine salt, was placed in a flash which was purged with nitrogen, sealed and allowed to stand at room temperature for a week. At the end of this time, the solution had become a rubbery solid due to the polymerization of styrene. When another portion of the styrene was allowed to stand for a similar length of time in the absence of the aforementioned salt, no noticeable polymerization took place. $\alpha,\alpha$-Dimethylbenzyl hydroperoxide was not an effective polymerization catalyst under the same conditions.

These salts can also be used to copolymerize substances, such as styrene and methyl methacrylate, at room temperature. Thus, these salts are highly useful in polymerization processes which utilize hydroperoxide catalysts.

These salts are also useful as oxidants in rocket propellant compositions. They are strong oxidizing agents and many of them are highly stable even under relatively high temperatures.

It is not intended to restrict the present invention to the foregoing examples which are merely given to demonstrate some of the embodiments of the invention. It should only be limited to the appended claims in which

What is claimed is:

1. An organic hydroperoxide-amine salt of the formula:

$$R(O_2H)_y \cdot [N(R_a)_z]_y$$

wherein R is selected from the group consisting of alkyl, aralkyl, and alkylene of from 1 to 20 carbon atoms, $R_a$ is selected from the group consisting of hydrogen and alkyl, aralkyl, and alkylene of from 1 to 20 carbon atoms, y is an integer of 1 to 5, and z is an integer of 1 to 3.

2. An organic hydroperoxide-triethylenediamine salt of the formula:

$$R_f O_2 H \cdot N(CH_2\text{---}CH_2)_3 N \cdot HO_2 R_f$$

wherein $R_f$ is selected from the group consisting of alkyl and aralkyl of from 1 to 20 carbon atoms.

3. A 2,5 - dimethylhexane-2,5-dihydroperoxide-amine salt of the formula:

$$(R_a)_3 N \cdot HO_2\text{---}C(CH_3)_2\text{---}(CH_2)_2\text{---}C(CH_3)_2\text{---}O_2H \cdot N(R_a)_3$$

wherein $R_a$ is selected from the group consisting of hydrogen and alkyl, aralkyl and alkylene of from 1 to 20 carbon atoms.

4. An organic dihydroperoxide-diamine salt of the formula:

$$R(O_2H)_2[N(R_a)_z]_2$$

wherein R is an alkylene of from 1 to 20 carbon atoms, $R_a$ is selected from the group consisting of hydrogen and alkyl, aralkyl and alkylene of from 1 to 20 carbon atoms, and z is an integer of 1 to 3.

5. Triethylenediammonium 2,5-dimethylhexane-2,5-diperoxide.

6. Triethylenediammonium bis-cumene peroxide.

7. A process for preparing a hydroperoxide-amine salt which comprises mixing a hydrocarbyl hydroperoxide containing 1 to 20 carbon atoms with an organic amine having the formula:

$$N(R_h)_3$$

wherein $R_h$ is chosen from the group consisting of hydrogen and alkyl, aralkyl and alkylene of from 1 to 20 carbon atoms.

8. A process for preparing hydroperoxide-amine salts which comprises mixing a hydrocarbyl hydroperoxide containing 1 to 20 carbon atoms with a tertiary alkylamine at a temperature between about −10° C. and 50° C.

References Cited by the Examiner

Chemical Abstracts, volume 53, page 1228 (1959); abstracting Izvest. Akad. Nauk S.S.S.R. Otdel. Khim. Nauk, 80 (9-3-58).

Rieche et al.: Chemische Berichte, volume 92, Nr. 1-6, pages 1206–1212 (1959).

Rieche et al.: Chemische Berichte, volume 92, Nr. 7-9, pages 2239–2252 (1959).

Schmitz, Chemische Berichte, volume 93, No. 1-6, pages 614–617 (1960).

IRVING MARCUS, *Primary Examiner.*

WALTER A. MODANCE, *Examiner.*